United States Patent

Heintz

[15] 3,700,944
[45] Oct. 24, 1972

[54] DISC-TYPE VARIABLE RELUCTANCE ROTATING MACHINE

[72] Inventor: Walter K. Heintz, Westland, Mich.
[73] Assignee: Ford Motor Company, Dearborn, Mich.
[22] Filed: Nov. 8, 1971
[21] Appl. No.: 196,614

[52] U.S. Cl. ....................310/168, 310/112, 310/268
[51] Int. Cl. ..............................................H02k 19/02
[58] Field of Search......................310/168, 268, 112

[56] References Cited

UNITED STATES PATENTS

| | | | |
|---|---|---|---|
| 3,383,533 | 5/1968 | Jarret et al. | 310/168 |
| 3,401,285 | 9/1968 | French et al. | 310/168 |
| 3,432,706 | 3/1969 | Beyersdorf et al. | 310/268 X |
| 3,435,267 | 3/1969 | Beyersdorf et al. | 310/168 |
| 3,469,134 | 9/1969 | Beyersdorf et al. | 310/268 X |
| 3,018,396 | 1/1962 | Colgate | 310/268 |

Primary Examiner—D. F. Duggan
Attorney—Keith L. Zerschling et al.

[57] ABSTRACT

Described is a novel design for a disc-type variable reluctance rotating machine. The rotating machine, preferably used as a motor, is brushless and in the preferred form comprises a plurality of stator discs that are supported by a frame including a pair of spaced and parallel end plates. A shaft is rotatably journaled in the end plates and the stator discs are separated from one another by a plurality of rotor discs attached to the shaft for rotation therewith. The stator discs each have an annular channel in which a helically wound winding is positioned. Each of the stator discs also includes a plurality of equally spaced inner and outer inserts made from a magnetic material. The rotor discs also have inserts made from magnetic material to form a flux path around the winding in each of the stator discs. The rotating machine of the invention may be operated as an AC synchronous machine or as a pulsed-current variable speed machine.

9 Claims, 4 Drawing Figures

PATENTED OCT 24 1972
3,700,944
SHEET 2 OF 2
FIG.2
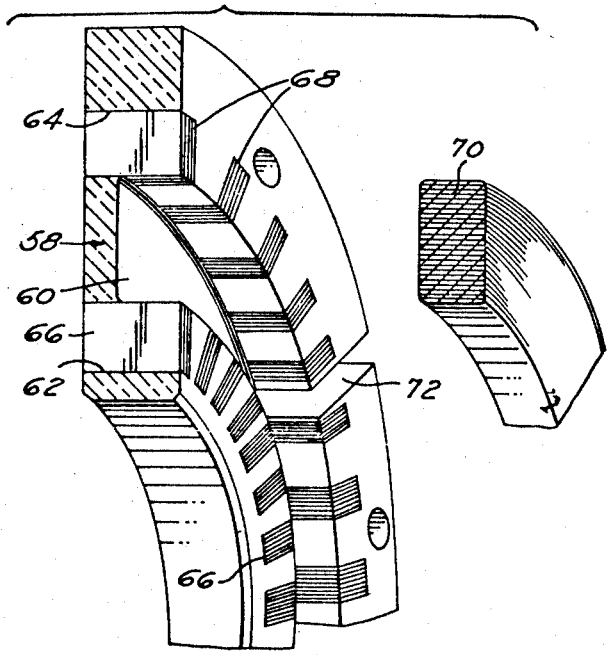
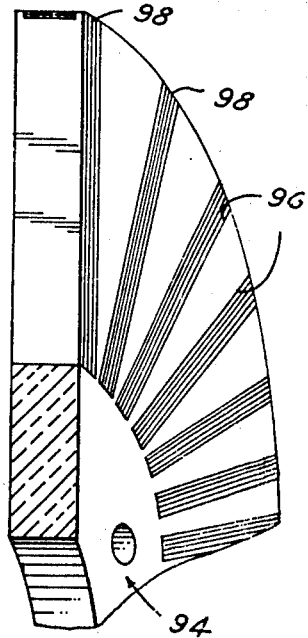
FIG.3
FIG.4
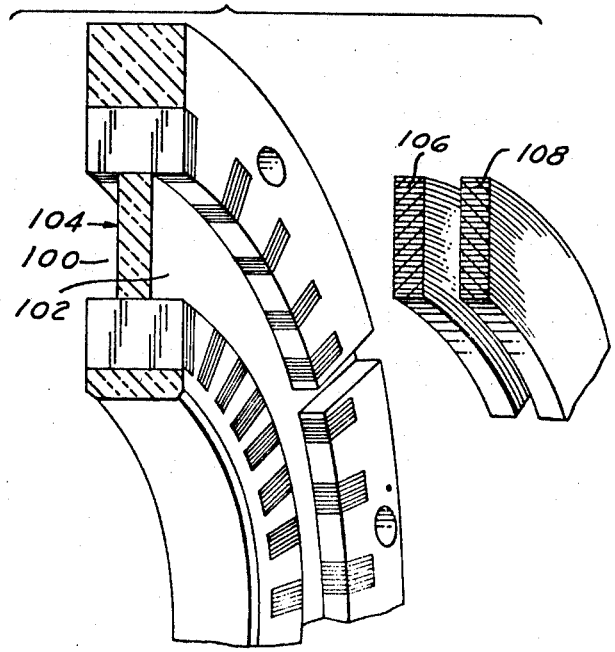

DISC-TYPE VARIABLE RELUCTANCE ROTATING MACHINE

BACKGROUND OF THE INVENTION

This invention relates to disc-type variable reluctance rotating machines. More particularly, the invention relates to a novel construction for a machine of this type.

Disc-type variable reluctance rotating machines are well known in the prior art. The construction and operation of a known design of a reluctance motor, together with various control circuits for such motors, may be seen in U.S. Pat. Nos. 3,560,817 and 3,560,818, issued Feb. 2, 1971, to C. J. Amato, and in U.S. Pat. No. 3,560,820, issued Feb. 2, 1971, in the name of L. E. Unnewehr. Additional control circuits for motors of this type may be seen in U.S. Pat. application Ser. Nos. 121,653 and 121,654, filed in the name of L. E. Unnewehr, 121,655, filed in the name of D. R. Hamburg, and 121,656, filed in the name of W. H. Koch, all of the foregoing U.S. Pat. applications having been filed March 8, 1971, and assigned to the Ford Motor Company.

The motor described in the above-identified references is a three-phase motor design. However, each of the phases is controlled in a similar manner and the principle of operation is identical for all of the phases. The various control circuits for supplying electrical energy to the motor illustrated in the references can also be applied to the variable reluctance rotating machine of the present invention.

SUMMARY OF THE INVENTION

The disc-type variable reluctance rotating machine of the invention is advantageous over other machines in that it has a relatively simple construction, and its power rating can be varied merely by changing the length of the rotating shaft and the number of rotor and stator discs. Also, the design of the stator discs is unique in that it has an annular channel in which a winding is positioned. If desired, the winding may be split into two parts that are positioned in a pair of channels in the stator disc. One of the advantages of positioning the winding in a channel arises from the relationship of the channel with the rotor, which permits the winding to be easily cooled.

The variable reluctance rotating machine of the invention comprises a frame including a pair of end plates parallel to and spaced from one another. A shaft is rotatably journaled in the end plates for rotation about its axis. At least one stator disc is positioned intermediate the end plates and is supported thereby. The stator disc has a central opening therein through which the shaft passes. The stator disc includes a stator ring made from a non-magnetic material. The stator ring has an annular channel therein that is concentric with the axis of the stator ring, and it also has a plurality of equally-spaced inner openings extending axially therethrough on the radially inward side of the annular channel. An equal plurality of equally-spaced outer openings extend axially through the stator ring on the radially outer side of the annular channel. The outer openings are in radial alignment, respectively, with the inner openings. Inner and outer stator disc inserts, made from a magnetic material, are positioned in each of the inner and outer openings in the stator ring. A helical winding is positioned in the annular channel in the stator ring.

The rotating machine also includes at least one rotor disc positioned between one of the end plates and the stator disc. The rotor disc is attached to the shaft of the machine for rotation therewith. The rotor disc includes a rotor ring made from a non-magnetic material. It has a plurality of equally-spaced slots which extend in a radial direction. Rotor inserts, made from a magnetic material, are positioned in each of the slots to permit them alternately to come into and to go out of axial alignment with the inner and outer stator disc inserts when the shaft and rotor disc are rotated.

Preferably, the machine of the invention includes a plurality of stator discs and a plurality of rotor discs, the rotor discs exceeding by one the number of stator discs. The stator discs are positioned in spaced locations along the axis of the machine. The rotor discs are positioned between and adjacent to the various stator discs.

Where the machine is provided with a plurality of rotor discs and stator discs, it may be used in multi-phase operation. This may be accomplished by the axial misalignment of the inner and outer stator disc inserts in one of the stator discs with respect to such inserts in another of the stator discs.

Reference has been made, and will be made hereinafter, to inner and outer stator disc inserts and to rotor disc inserts made from a "magnetic material." The term "magnetic material" as used herein refers to a material having a permeability substantially greater than the permeability of free space.

BRIEF DESCRIPTION OF THE DRAWINGS

FIG. 2 is a partial pictorial view of a stator disc for the machine of FIG. 1;

FIG. 3 is a partial pictorial view of a rotor disc for the machine of FIG. 1; and FIG. 4 is an alternate construction for a stator disc for the machine of FIG. 1.

DETAILED DESCRIPTION OF THE INVENTION

Figure 1:
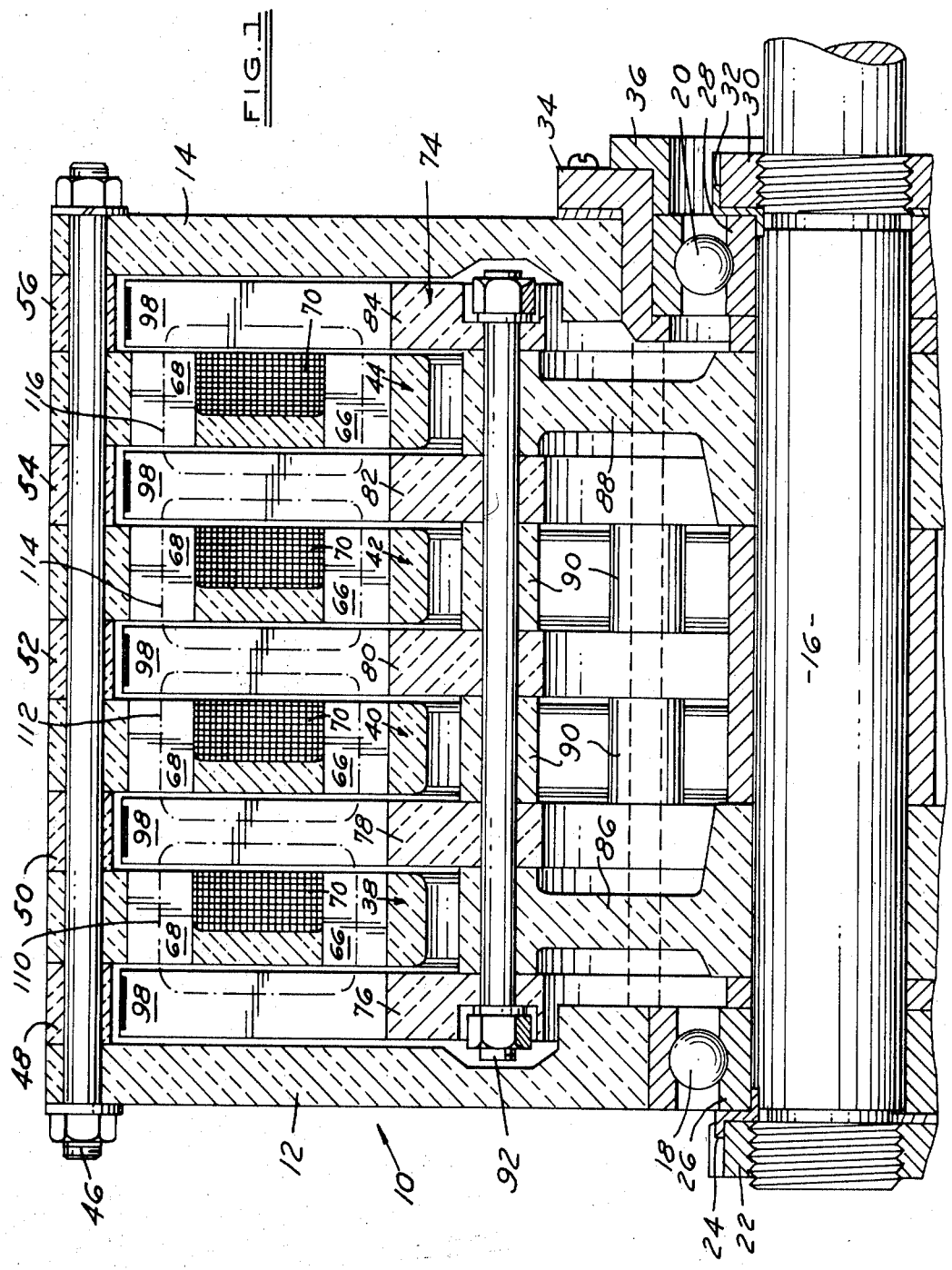
FIG. 1 is a sectional view of one-half of a disc-type variable reluctance rotating machine constructed in accordance with the invention.

With reference now to the drawings and to FIGS. 1, 2, and 3 in particular, there is shown a disc-type variable reluctance rotating machine designated generally by the numeral 10.

The rotating machine 10 includes a frame structure including a pair of end plates 12 and 14. In the form of the machine shown, these end plates are made from a non-magnetic material, such as fabric-reinforced phenolic. Other material such as non-magnetic stainless steel may also be used. A shaft 16 is journaled in the end plates 12 and 14 for rotation about its own axis by means of ball bearings 18 and 20. A nut 22 threaded on the shaft 16 and a bearing retainer 24 hold the inner race 26 of the ball bearing 18 in position. The bearing 20 has an inner race 28 that is held in position in a similar manner by the nut 30 and bearing retainer 32. The outer race 34 of the bearing 20 is held in position by a bearing adapter 34 and a bearing retainer 36. Preferably, the shaft 16 and the associated bearings 18 and 20 and the retainers therefor are made from non-magnetic material, such as non-magnetic steel.

The variable reluctance machine 10 includes a plurality of stator discs 38, 40, 42 and 44. The stator discs are supported by the frame structure including the end plates 12 and 14 by means of tie rods 46. The stator discs 38, 40, 42 and 44 are equally spaced between the end plates 12 and 14 by means of spacers 48, 50, 52, 54 and 56.

The construction of the stator discs 38, 40, 42 and 44 is shown in detail in FIG. 2. From FIG. 2, it may be seen that the stator discs include a stator ring 58 that is made from a non-magnetic material, such as fabric-reinforced phenolic. The stator ring 58 has an annular channel 60 therein that is concentric with the axis of the stator ring and, also, with the axis of the shaft 16. In addition, the stator ring 58 has a plurality of equally-spaced openings 62 extending in an axial direction therethrough on the radially inward side of the annular channel 60. Similarly, the stator ring 58 has an equal plurality of openings 64 extending in an axial direction on the radially outward side of the annular channel 60. The openings 62 and 64 are in radial alignment with one another. The inner openings 62 have laminated ferromagnetic inner stator disc inserts 66 positioned within them, and the outer openings 64 have laminated ferromagnetic outer stator inserts 68 positioned within them. A helically wound winding 70, shown to the right in FIG. 2 for purposes of clarity, is positioned in the annular channel 60. The winding 70 preferably is made from a flat conductive strip, but it may also be wound from a wire of circular or other cross-section. The leads from the winding 70 may exit from the stator disc through a path 72 provided in the stator ring.

With reference once again to FIG. 1, it may be seen that the variable reluctance machine includes a rotor assembly 74. The rotor assembly 74 includes rotor discs 76, 78, 80, 82, and 84. A rotor support ring 86 is positioned between rotor discs 76 and 78, and another rotor support ring 88 is positioned between rotor discs 82 and 84. The rotor support rings 86 and 88 are attached to the shaft 16 by any suitable means to enable it to rotate therewith. Spacers 90 are positioned between the rotor discs 78 and 80 and between the rotor discs 80 and 82. Thus, it is apparent that the rotor assembly including the rotor discs, spacers, and rotor support rings will rotate with the shaft 16. The rotor discs 76, 78, 80, 82 and 84 move, respectively, within the spaces formed between the end plate 12 and the stator disc 38, between the stator discs 38 and 40, between the stator discs 40 and 42, between the stator discs 42 and 44, and between the stator disc 44 and the end plate 14.

A plurality of tie rods 92 are provided to hold the rotor assembly 74 together. It should be noted that the rotor discs exceed by one the number of stator discs.

The construction of the rotor discs 76, 78, 80, 82 and 84 may best be seen in FIG. 3. The rotor discs include a rotor ring 94 which has a plurality of radially extending slots 96 therein. The rotor disc 94 is made from a non-magnetic material, such as fabric-reinforced phenolic. Positioned within the slots 96 in the rotor ring 94 are rotor disc inserts 98. The rotor disc inserts 98 are made from a magnetic material, preferably, a laminated ferromagnetic material having laminations extending in a radial direction as shown in FIG. 3.

With reference now to FIG. 4, there is shown an alternative construction for the stator discs 38, 40, 42 and 44. The construction shown in FIG. 4 differs from that in FIG. 2 in that there are two annular channels 100 and 102 in a stator ring 104. This is advantageous in that a split winding may be used. Preferably, this split winding is comprised of two helically wound flat conductive strips 106 and 108, which are assembled with the stator disc 104 in the annular channels 100 and 102, respectively.

The operation of the variable reluctance rotating machine will now be described in connection with FIGS. 1 through 3. With respect to this description, it should be appreciated that when there is current in the windings 70 of stator discs 38, 40, 42 and 44, magnetic flux is produced which is illustrated by the broken line paths 110, 112, 114, and 116, respectively.

As depicted in FIG. 1, the rotor disc inserts 98 are in axial alignment with the inner stator disc inserts 66 and the outer stator disc inserts 68. Because these rotor disc and stator disc inserts are made from a magnetic material, it is apparent that the reluctance of the magnetic paths around the windings 70 is at a minimum when the rotor assembly 74 is in this position. However, as the rotor assembly 74 is rotated, the reluctance of the magnetic paths 110, 112, 114, and 116 increases until the time when the rotor disc inserts 98 are midway between the inner and outer stator disc inserts 66 and 68. Continued rotation of the rotor assembly 74 causes the reluctance of the magnetic circuits to decrease until the minimum reluctance is achieved when the rotor disc inserts and stator disc inserts are once again in axial alignment. Thus, the rotor disc inserts alternately come into and go out of axial alignment with the stator disc inserts as the rotor assembly 74 is rotated.

If current is made to flow in the windings 70 during intervals of decreasing magnetic reluctance, and if a lesser quantity or no current flows in the windings 70 during intervals of increasing reluctance, then the rotor assembly 74 will continue to rotate and electromechanical energy conversion will have taken place. The rotor assembly 74 will continue to rotate because a torque is produced tending to draw the rotor disc inserts 98 toward the stator disc inserts 66 and 68. This torque is the result of the tendency of a magnetic circuit to produce a force to minimize the reluctance of the magnetic circuit. This torque may also be thought of as the result of the attractive forces between north poles and south poles.

The variable reluctance machine illustrated in FIG. 1 is a single-phase machine, and it may not have sufficient starting torque to produce continued rotation of the rotor assembly 74. This would occur, for example, if the rotor assembly 74 were initially stationary with the rotor disc inserts 98 in axial alignment with the stator disc inserts 66 and 68. This disadvantage may be overcome by the use of a multi-phase construction for the variable reluctance rotating machine. This may be accomplished by the axial misalignment of the inner and outer stator disc inserts 66 and 68 of one of the stator discs with respect to such inserts in another of the stator discs. For example, the inner and outer stator disc inserts 66 and 68 of the stator discs 38 and 42 could be axially misaligned with such inner and outer inserts in the stator discs 40 and 44. In such case, the magnetic paths 110 and 114 could not have a minimum reluctance at the same time as the magnetic paths 112 and 116. Therefore, a starting torque could be produced by the application of winding current to the windings 70 of stator discs 38 and 42 or to the windings 70 of stator discs 40 and 44. A better understanding of multi-phase disc-type variable reluctance rotating machine design may be obtained by reference to the aforementioned patents and patent applications.

A functional variable reluctance rotating machine constructed in accordance with the invention need only include one stator disc and one rotor assembly, but, preferably, two rotor discs would be used with the two rotor discs being positioned adjacent to and on opposite sides of the stator disc. Of course, a greater number of stator and rotor discs may be used if desired.

The machine of the invention can be operated as a pulsed-current machine, or it can be operated as an AC synchronous machine if means are provided for bringing the shaft and rotor discs up to synchronous speed. This is necessary because the machine lacks starting torque when operated with AC.

Based upon the foregoing description of the invention, what is claimed and desired to be protected by Letters Patent is:

1. A variable reluctance rotating machine, which comprises:
   a. a frame including a pair of end plates parallel to and spaced from one another;
   b. a shaft rotatably journaled in said end plates for rotation about its axis;
   c. a stator disc positioned intermediate said end plates and supported by said frame, said stator disc comprising a stator ring through which said shaft passes, said stator ring being made from a non-magnetic material and having an annular channel therein concentric with the axis of said stator ring, said stator ring also having a plurality of equally-spaced inner openings extending axially therethrough on the radially inward side of said channel and an equal plurality of equally-spaced outer openings extending axially therethrough on the radially outward side of said channel, said outer openings being in radial alignment, respectively, with said inner openings; a helical winding positioned in said annular channel in said stator ring; and inner and outer stator disc inserts, made from magnetic material, positioned in each of said inner and outer openings in said stator rings; and
   d. a rotor disc positioned between one of said end plates and said stator disc, said rotor disc being attached to said shaft for rotation therewith, said rotor disc comprising a rotor ring, made from a non-magnetic material and having a plurality of equally-spaced radially extending slots therein, and rotor inserts, made from a magnetic material and positioned in each of said slots to permit them alternately to come into and go out of axial alignment with said inner and outer stator disc inserts when said shaft and rotor disc are rotated.

2. A variable reluctance rotating machine in accordance with claim 1, which further comprises a second rotor disc having a structure as defined in (d) of claim 1, said second rotor disc being attached to said shaft for rotation therewith and being positioned between said stator disc and the other of said end plates.

3. A variable reluctance rotating machine in accordance with claim 1, wherein said stator disc includes a second annular channel therein concentric with the axis of said stator ring and wherein said stator disc further includes a second helical winding positioned in said second annular channel in said stator ring.

4. A variable reluctance rotating machine in accordance with claim 2, wherein said stator disc further includes a second annular channel in said stator ring concentric with the axis of said stator ring and wherein said stator disc further includes a second helical winding positioned in said second annular channel in said stator ring.

5. A variable reluctance rotating machine, which comprises:
   a. a frame including a pair of end plates parallel to and spaced from one another;
   b. a shaft rotatably journaled in said end plates for rotation about its axis;
   c. a plurality of stator discs equally-spaced from one another in an axial direction and positioned intermediate said end plates and supported by said frame, each of said stator discs comprising a stator ring through which said shaft passes, said stator ring being made from a non-magnetic material and having an annular channel therein concentric with the axis of said stator ring, said stator ring also having a plurality of equally-spaced inner openings extending axially therethrough on the radially inward side of said channel and an equal plurality of equally-spaced outer openings extending axially therethrough on the radially outward side of said channel, said outer openings being in radial alignment, respectively, with said inner openings; a helical winding positioned in said annular channel in said stator ring; and inner and outer stator disc inserts, made from magnetic material, positioned in each of said inner and outer openings in said stator ring; and
   d. a plurality of rotor discs, exceeding by one the number of said stator discs, said stator discs being positioned between said rotor discs and said rotor discs being attached to said shaft for rotation therewith, each of said rotor discs comprising a rotor ring, made from a non-magnetic material and having a plurality of equally-spaced radially extending slots therein, and rotor inserts, made from a magnetic material and positioned in each of said slots to permit them alternately to come into and to go out of axial alignment with said inner and outer stator disc inserts when said shaft and rotor disc are rotated.

6. A variable reluctance rotating machine in accordance with claim 5, wherein said inner and outer stator disc inserts of at least one of said stator discs are misaligned with respect to such inserts in another of said stator discs.

7. A variable reluctance rotating machine in accordance with claim 5, wherein at least one of said stator discs further includes a second annular channel in its stator ring, said second annular channel being concentric with the axis of said stator ring, and a second helical winding positioned in said second annular channel in said stator ring.

8. A variable reluctance motor in accordance with claim 7, wherein said inner and outer stator disc inserts in at least one of said stator discs are misaligned with respect to such inserts in another of said stator discs.

9. A variable reluctance rotating machine, which comprises:

a. a frame including a pair of end plates parallel to and spaced from one another;

b. a shaft rotatably journaled in said end plates for rotation about its axis;

c. a plurality of stator discs equally-spaced from one another and positioned intermediate said end plates and supported by said frame, each of said stator discs comprising a stator ring through which said shaft passes, said stator ring being made from a non-magnetic material and having an annular channel therein concentric with the axis of said stator ring, said stator ring also having a plurality of equally-spaced inner openings extending axially therethrough on the radially inward side of said channel and an equal plurality of equally-spaced outer openings extending axially therethrough on the radially outward side of said channel, said outer openings being in radial alignment, respectively, with said inner openings; a helical winding positioned in said annular channel in said stator ring; and inner and outer stator disc inserts, made from magnetic material, positioned in each of said inner and outer openings in said stator ring; and d. a rotor assembly, said rotor assembly comprising a pair of rotor support rings attached to said shaft for rotation therewith and a plurality of equally-spaced rotor discs supported by said rotor support rings and exceeding by one the number of said stator discs, said stator discs being positioned between said rotor discs, and each of said rotor discs including a rotor ring, made from a non-magnetic material and having a plurality of equally-spaced radially extending slots therein, and rotor inserts, made from a magnetic material and positioned in each of said slots to permit them alternately to come into and go out of axial alignment with said inner and outer stator disc inserts when said shaft and rotor assembly are rotated.

* * * * *